(12) United States Patent
Kojima et al.

(10) Patent No.: US 12,292,744 B2
(45) Date of Patent: May 6, 2025

(54) AIRCRAFT CONTROL SYSTEM, AIRCRAFT, AIRCRAFT CONTROL METHOD, AND PROGRAM

(71) Applicant: MITSUBISHI HEAVY INDUSTRIES, LTD., Tokyo (JP)

(72) Inventors: Toru Kojima, Tokyo (JP); Satoshi Mori, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/036,527

(22) PCT Filed: Jan. 13, 2022

(86) PCT No.: PCT/IB2022/050230
§ 371 (c)(1),
(2) Date: May 11, 2023

(87) PCT Pub. No.: WO2022/101893
PCT Pub. Date: May 19, 2022

(65) Prior Publication Data
US 2023/0409050 A1 Dec. 21, 2023

(30) Foreign Application Priority Data
Nov. 13, 2020 (JP) .................. 2020-189570

(51) Int. Cl.
*G08G 5/54* (2025.01)
*G05D 1/00* (2006.01)

(52) U.S. Cl.
CPC ............. *G05D 1/0825* (2013.01); *G08G 5/54* (2025.01)

(58) Field of Classification Search
None
See application file for complete search history.

(56) References Cited

U.S. PATENT DOCUMENTS

| 11,656,632 B2 * | 5/2023 | Kearney-Fischer ... G05D 1/046 701/15 |
| 2005/0125142 A1 | 6/2005 | Yamane |

(Continued)

FOREIGN PATENT DOCUMENTS

| DE | 26 55 370 | 6/1977 |
| EP | 1 854 717 | 11/2007 |

(Continued)

OTHER PUBLICATIONS

Extended European Search Report issued Jan. 25, 2024 in corresponding European Patent Application No. 22723003.4.

(Continued)

*Primary Examiner* — James M McPherson
(74) *Attorney, Agent, or Firm* — Wenderoth, Lind & Ponack, L.L.P.

(57) ABSTRACT

An aircraft control system includes a target instruction value calculation unit configured to acquire a target instruction value to set an aircraft in a target state, a reference velocity calculation unit configured to input, to a reference model in which a reference velocity corresponding to a reference value of an aircraft velocity is set uniquely as an output value according to an input value, a value based on the target instruction value as the input value. A relative velocity calculation unit is configured to calculate a relative velocity of the aircraft to a target position. An estimated disturbance quantity calculation unit is configured to calculate an estimated disturbance quantity acting on the aircraft, based on a difference between the relative and reference velocities, and a correction target instruction value calculation unit is configured to correct the target instruction value, based on the estimated disturbance quantity calculated at a previous time.

10 Claims, 10 Drawing Sheets

(56) References Cited

U.S. PATENT DOCUMENTS

| | | | |
|---|---|---|---|
| 2008/0071431 A1* | 3/2008 | Dockter | G05D 1/0684 |
| | | | 701/3 |
| 2009/0132104 A1 | 5/2009 | Rupnik et al. | |
| 2009/0157239 A1 | 6/2009 | Walton et al. | |
| 2011/0282523 A1 | 11/2011 | Shue | |
| 2014/0350754 A1* | 11/2014 | Elgersma | G08G 5/025 |
| | | | 701/16 |
| 2015/0286220 A1* | 10/2015 | Geiger | G05D 1/0684 |
| | | | 701/3 |
| 2016/0306363 A1* | 10/2016 | Wang | B64C 27/04 |
| 2017/0030735 A1* | 2/2017 | Mohideen | B64D 45/04 |
| 2017/0229028 A1* | 8/2017 | Feldmann | G08G 5/025 |
| 2019/0235525 A1* | 8/2019 | Cooper | B63B 45/04 |
| 2019/0265729 A1* | 8/2019 | Gillett | B64C 27/04 |
| 2019/0368881 A1* | 12/2019 | Bobye | G08G 5/025 |

FOREIGN PATENT DOCUMENTS

| | | |
|---|---|---|
| GB | 1 552 365 | 9/1979 |
| JP | 2005-115623 | 4/2005 |

OTHER PUBLICATIONS

International Search Report issued Apr. 12, 2022 in International (PCT) Application No. PCT/IB2022/050230.

\* cited by examiner

AIRCRAFT CONTROL SYSTEM, AIRCRAFT, AIRCRAFT CONTROL METHOD, AND PROGRAM

FIELD

The present invention relates to an aircraft control system, an aircraft, an aircraft control method, and a program.

BACKGROUND

Techniques for guiding an aircraft to a target point have been known conventionally. For example, Japanese Patent Application No. 2005-115623 discloses a navigation device that obtains the distance to a target point by performing image processing on image information on the target point acquired with a stereo camera, calculates the relative position of an aircraft to the target point on the basis of the distance and the attitude angle of the aircraft, and generates the navigation information using the relative position.

CITATION LIST

Patent Literature

Patent Literature 1: Japanese Patent Application Laid-open No. 2005-115623

SUMMARY

Technical Problem

When an aircraft flies, a disturbance such as a gust occurs and for example, a method according to Patent Literature 1 may fail to control the aircraft properly.

The present disclosure is to solve the aforementioned problem and an object is to provide an aircraft control system, an aircraft, an aircraft control method, and a program that can properly control an aircraft even in the occurrence of a disturbance.

Solution to Problem

To solve the above problem and achieve the object, an aircraft control system according to the present disclosure includes: a target instruction value calculation unit that acquires a target instruction value to set an aircraft in a target state; a reference velocity calculation unit that inputs, to a reference model in which reference velocity corresponding to a reference value of aircraft velocity is set uniquely as an output value in accordance with an input value, a value based on the target instruction value as the input value, to calculate the reference velocity; a relative velocity calculation unit that calculates relative velocity of the aircraft to a target position, the relative velocity being used in control of the aircraft; an estimated disturbance quantity calculation unit that calculates an estimated disturbance quantity acting on the aircraft, based on a difference between the relative velocity and the reference velocity; and a correction target instruction value calculation unit that corrects the target instruction value based on the estimated disturbance quantity calculated at a previous timing.

To solve the above problem and achieve the object, an aircraft according to the present disclosure includes the above-described aircraft control system.

To solve the above problem and achieve the object, an aircraft control method according to the present disclosure includes the steps of: acquiring a target instruction value to set an aircraft in a target state; inputting, to a reference model in which reference velocity corresponding to a reference value of aircraft velocity is set uniquely as an output value in accordance with an input value, a value based on the target instruction value as the input value, to calculate the reference velocity; calculating relative velocity of the aircraft to a target position, the relative velocity being used in control of the aircraft; calculating an estimated disturbance quantity acting on the aircraft, based on a difference between the relative velocity and the reference velocity; and correcting the target instruction value, based on the estimated disturbance quantity calculated at a previous timing.

To solve the above problem and achieve the object, a program according to the present disclosure causes a computer to execute: acquiring a target instruction value to set an aircraft in a target state; inputting, to a reference model in which reference velocity corresponding to a reference value of aircraft velocity is set uniquely as an output value in accordance with an input value, a value based on the target instruction value as the input value, to calculate the reference velocity; calculating relative velocity of the aircraft to a target position, the relative velocity being used in control of the aircraft; calculating an estimated disturbance quantity acting on the aircraft, based on a difference between the relative velocity and the reference velocity; and correcting the target instruction value, based on the estimated disturbance quantity calculated at a previous timing.

Advantageous Effects of Invention

According to the present disclosure, an aircraft can be properly controlled even in the occurrence of a disturbance.

DESCRIPTION OF EMBODIMENTS

A preferred embodiment of the present invention will hereinafter be described in detail with reference to the accompanying drawings. The present invention is not limited by this embodiment, and if there is more than one embodiment, the embodiments may be implemented in combination.

Figure 1:
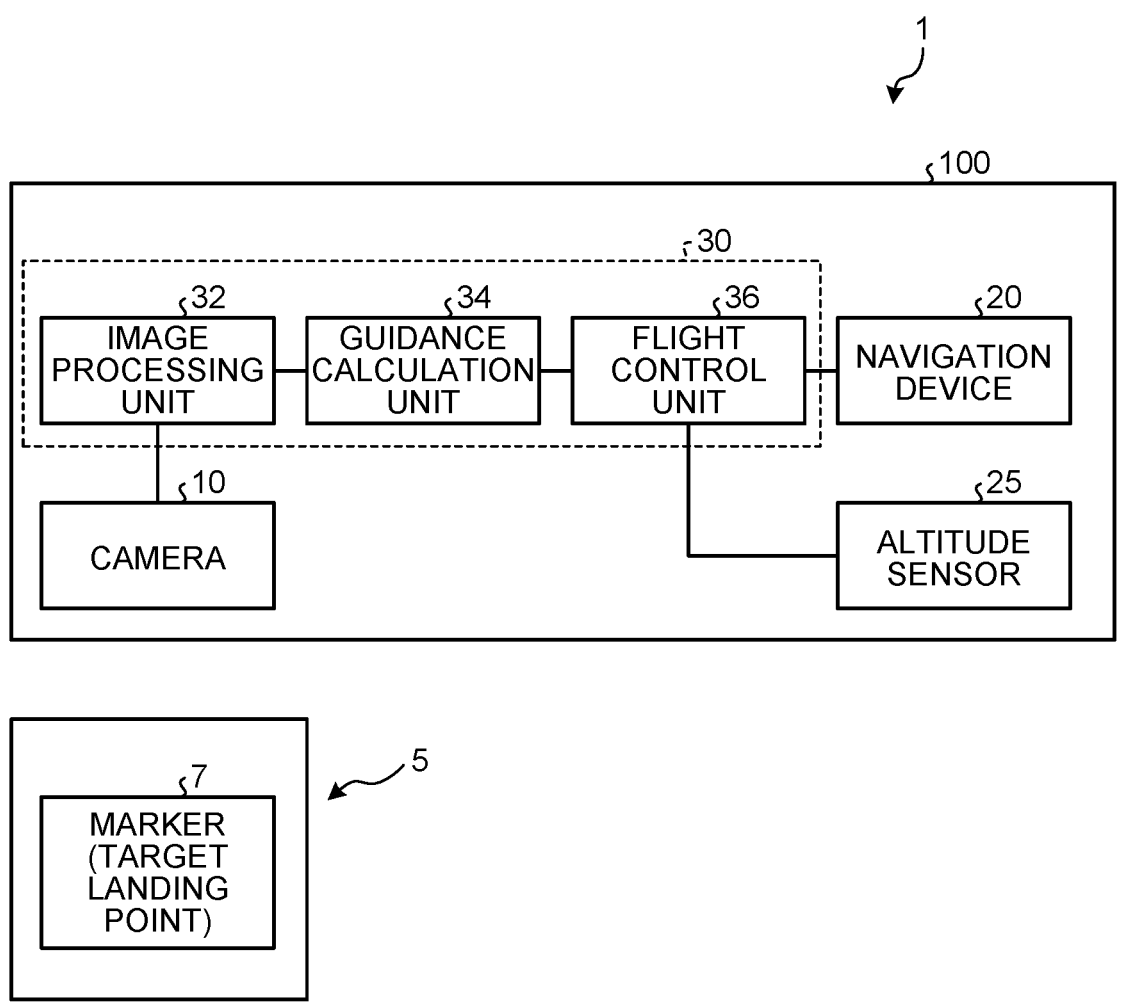
FIG. 1 is a schematic structure diagram illustrating one example of a control system for an aircraft according to the present embodiment.
Figure 2:
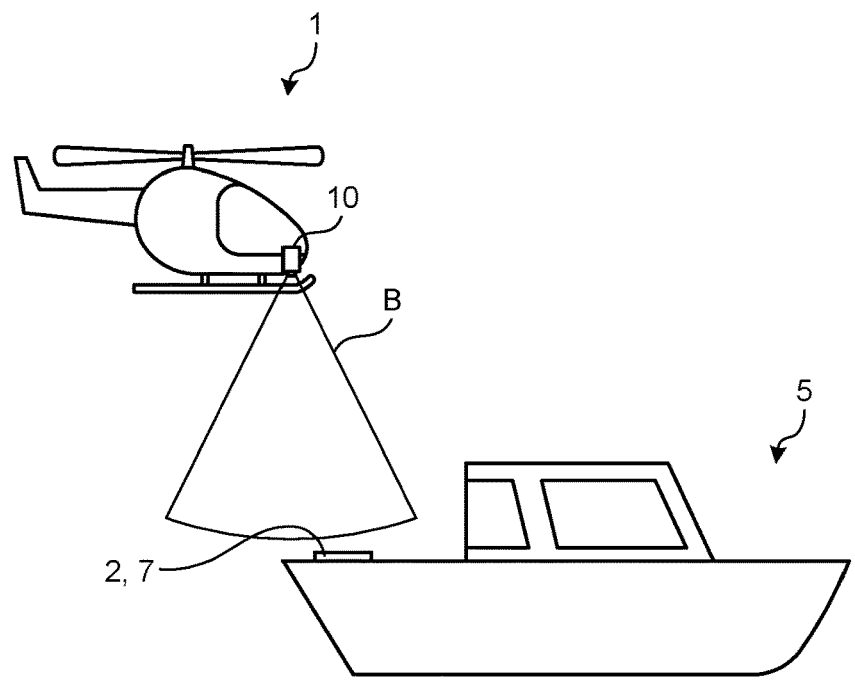
FIG. 2 is an explanatory diagram illustrating a state in which an aircraft according to the present embodiment heads to a target landing point.

FIG. 1 is a schematic structure diagram illustrating one example of a control system for an aircraft according to the present embodiment, and FIG. 2 is an explanatory diagram illustrating a state in which the aircraft according to the present embodiment heads to a target landing point. An aircraft 1 according to this embodiment is a flight vehicle as a rotorcraft (for example, helicopter, drone, etc.). In this embodiment, the aircraft 1 is an unmanned vehicle. The aircraft 1 may be any flight vehicle that can move forward, backward, sideways, turn, and hover, and may be a manned vehicle. The aircraft 1 includes a control system 100, and its flight is controlled by the control system 100 so that the aircraft 1 lands at a target landing point 2 illustrated in FIG. 2.

Target Landing Point

In this embodiment, the target landing point 2 is provided on a vessel 5 as illustrated in FIG. 2. Therefore, the aircraft 1 lands on the vessel 5 as a moving vehicle moving on the water. The vessel 5 includes a restraint device to restrain the aircraft 1 when the aircraft 1 lands at the target landing point 2, which is not illustrated in the drawing. However, the target landing point 2 is not limited to the vessel 5, and may alternatively be provided on a vehicle or the like as a moving object moving on the ground, or on non-moving equipment or on the ground. The target landing point 2 is not limited to the point where the aircraft 1 lands, but may be, for example, a target location that the aircraft 1 passes through. In other words, the target landing point 2 can be said to be the target position to which the aircraft 1 will fly.

Figure 3:
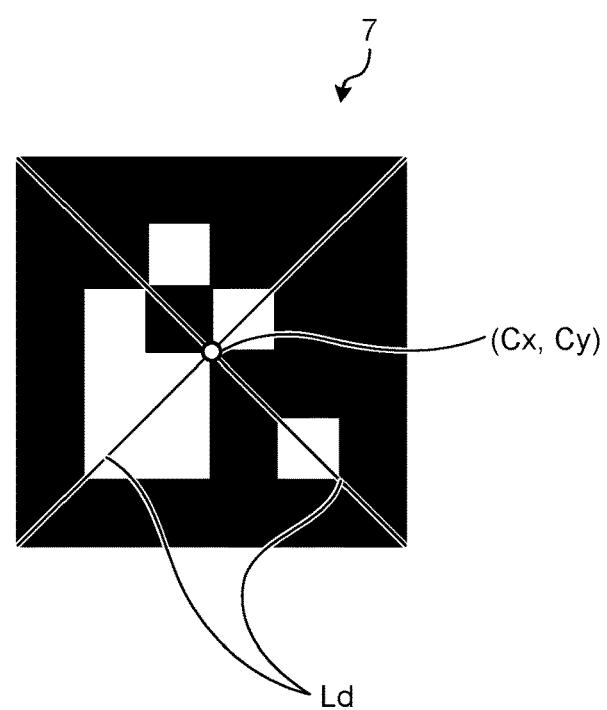
FIG. 3 is an explanatory diagram illustrating one example of a marker provided at the target landing point.

The target landing point 2 includes a marker 7 for the aircraft 1 to capture the position of the target landing point 2. FIG. 3 is an explanatory diagram illustrating one example of the marker provided at the target landing point. As illustrated in the drawing, the marker 7 is a square-shaped AR marker with two colors, black and white, for example. The marker 7 is not limited to the AR marker and may alternatively be any marker that can capture the position of the target landing point 2 by image processing, such as an H mark or an R mark indicating the landing point of a heliport. As the marker 7, a plurality of markers with different shapes may be provided on the vessel 5, and the aircraft 1 may be guided to the target landing point 2 corresponding to any of the different markers 7.

Control System

The control system 100 for the aircraft according to this embodiment is a system for controlling the flight of the aircraft 1 and controls the aircraft 1 so that, for example, the aircraft 1 in flight lands at the target landing point 2 or hovers following the target landing point 2. The control system 100 includes a computer, for example, and is mounted on the aircraft 1. The control system 100 includes a camera 10, a navigation device 20, a control unit 30, and an altitude sensor 25 as illustrated in FIG. 1.

Camera

The camera 10 is a photographing device mounted on the aircraft 1 via a gimbal that is not illustrated. The camera 10 may be a monocular camera, a compound-eye camera, an infrared camera, or the like, as long as the marker 7 can be photographed. The camera 10 is provided to photograph the marker 7 at the target landing point 2 from the aircraft 1. The camera 10 is able to adjust a photographing direction via the gimbal that is not illustrated. In this embodiment, the camera 10 is controlled by the control unit 30 so that its photographing range B (see FIG. 2 and FIG. 6) faces right downward in the vertical direction as one example. The camera 10 may be controlled by the control unit 30 so that the photographing range B faces forward at an angle to the vertical direction. The camera 10 may omit the gimbal and be fixed right under the body of the aircraft 1 so that the photographing direction faces downward in the vertical direction.

Navigation Device

The navigation device 20 is, for example, an inertial navigation system (INS). In this embodiment, the navigation device 20 will be described in application to an inertial navigation system; however, any navigation device 20 may be used without particular limitations. The navigation device 20 is an inertial navigation device that includes a global positioning system (GPS) to improve the accuracy of position measurement. In this embodiment, the application to the inertial navigation device including the GPS is described; however, it is not limited to the GPS and any position measurement unit that can measure the position with high accuracy may be used. For example, a quasi-zenith satellite system may be used. If the position can be measured with high accuracy only with the navigation device 20, the GPS or other position measurement unit may be omitted. The navigation device 20 including the GPS acquires, for example, attitude angles of the aircraft 1 in a roll direction, in a yaw direction, and in a pitch direction, aircraft velocity (Vx, Vy) (see FIG. 8A), aircraft acceleration (ax, ay) (see FIG. 8A), a nose azimuth $\psi h$ (see FIG. 6), and position coordinates of the aircraft 1. The navigation device 20 may have an attitude angle sensor to detect the attitude angle of the aircraft 1, a velocity detection sensor to detect the aircraft velocity (Vx, Vy) of the aircraft 1, an acceleration detection sensor to detect the aircraft acceleration (ax, ay) of the aircraft 1, and a sensor to detect the nose azimuth $\psi h$ of the aircraft 1. The navigation device 20 outputs the acquired attitude angle, aircraft velocity (Vx, Vy), aircraft acceleration (ax, ay), and position coordinate of the aircraft 1 to the control unit 30.

Altitude Sensor

The altitude sensor 25 is a sensor that detects the altitude of the aircraft 1 from the ground or a water surface. The altitude sensor 25 may be, for example, a laser altimeter, a radio altimeter, or a barometric altimeter and may be any altimeter. These altimeters may be used in combination as appropriate in accordance with the environment in which they are used, i.e., to measure the altitude from the ground surface and the altitude from the sea level. The altitude sensor 25 outputs the detected altitude of the aircraft 1 to the control unit 30. The control system 100 may cause, instead of the altitude sensor 25, an image processing unit 32, which is described below, to calculate the relative altitude between the aircraft 1 and the vessel 5 by applying image processing to an image including the marker 7 photographed by the camera 10.

Control Unit

The control unit 30 is an arithmetic device, or a central processing unit (CPU). The control unit 30 includes the image processing unit 32, a guidance calculation unit 34, and a flight control unit 36. The control unit 30 reads out and executes a program (software) from a storage unit of the control system 100, which is not illustrated, to implement the image processing unit 32, the guidance calculation unit 34, and the flight control unit 36 and execute their processes. The control unit 30 may execute these processes by a single CPU, or may include a plurality of CPUs and execute the processes with those CPUs. At least a part of the image processing unit 32, the guidance calculation unit 34, and the flight control unit 36 may be implemented in hardware circuitry. The control unit 30 includes a photographing control unit, which is not illustrated, that controls the photographing direction of the camera 10 via a gimbal, which is not illustrated, that is installed in the aircraft 1. In this embodiment, the camera 10 is adjusted so that the photographing range B of the camera 10 faces right downward in the vertical direction as described above.

Image Processing Unit

The image processing unit 32 applies image processing to an image photographed by the camera 10 to calculate a center (Cx, Cy) (see FIG. 3) of the marker 7, that is, the target landing point 2. The center (Cx, Cy) here is a coordinate point in a camera fixed coordinate system whose origin Oc (see FIG. 6) is the center of the image photographed by the camera 10, and can be calculated based on the number of pixels from the center of the image. The method for calculating the center (Cx, Cy) is described below. The image processing unit 32 outputs the calculated center (Cx, Cy) of the marker 7 to the guidance calculation unit 34. The target landing point 2 is not limited to the center (Cx, Cy) of the marker 7, and may be any of the four corners of the marker 7 or offset from the center of the marker 7.

The image processing unit 32 calculates a bow azimuth ψs of the vessel 5 (see FIG. 6) by applying image processing to the image including the marker 7 photographed by the camera 10 to specify the direction of the marker 7 and mapping the direction to the nose azimuth φh of the aircraft 1, which is acquired by the navigation device 20. The image processing unit 32 may also acquire the bow azimuth ψs, for example, by uplinking the value detected by a sensor on the vessel 5. The image processing unit 32 may calculate the relative altitude between the aircraft 1 and the vessel 5 by applying image processing to the image including the marker 7 photographed by the camera 10 as described above.

Guidance Calculation Unit

Figure 4:
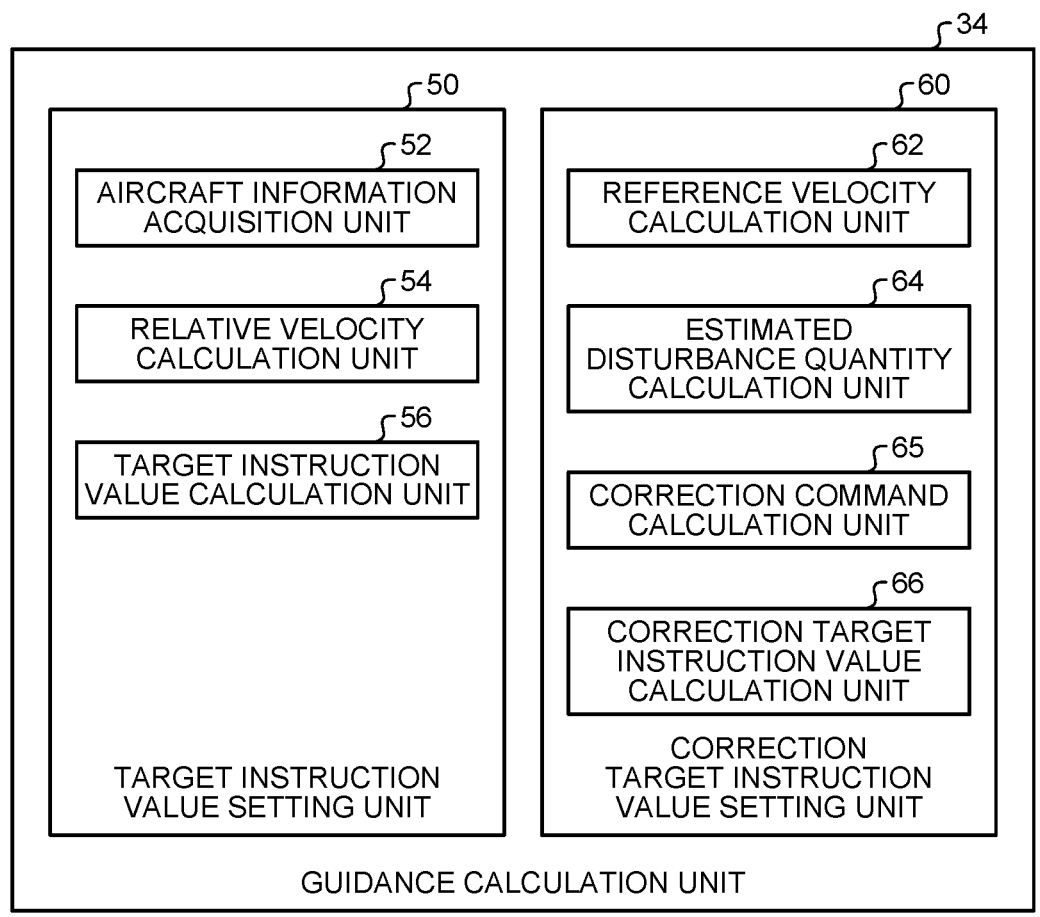
FIG. 4 is a schematic block diagram of a guidance calculation unit according to the present embodiment.

The guidance calculation unit 34 calculates a target instruction value θ0 of the aircraft 1. The target instruction value θ0 is the control quantity for adjusting the aircraft velocity (Vx, Vy), attitude angle, attitude rate, etc. of the aircraft 1. The target instruction value θ0 is, for example, the control quantity used to guide the aircraft 1 to the target landing point 2 or to hover following the target landing point 2. FIG. 4 is a schematic block diagram of the guidance calculation unit in this embodiment. As illustrated in FIG. 4, the guidance calculation unit 34 includes a target instruction value setting unit 50 that sets the target instruction value θ0 and a correction target instruction value setting unit 60 that corrects the target instruction value θ0 and sets the correction target instruction value θ.

Target Instruction Value Setting Unit

The target instruction value setting unit 50 acquires the target instruction value θ0. The target instruction value θ0 is the instruction value to set the aircraft 1 in a target state, which can also be called a target command. The target instruction value θ0 may be, for example, an instruction value for the attitude of the aircraft 1, such as an instruction value for the attitude angle in the pitch direction, the attitude angle in the roll direction, the attitude angle in the yaw direction of the aircraft 1, and the altitude in a collective direction. The target instruction value θ0 may be an instruction value for the velocity of the aircraft 1.

As illustrated in FIG. 4, the target instruction value setting unit 50 includes an aircraft information acquisition unit 52, a relative velocity calculation unit 54, and a target instruction value calculation unit 56. The target instruction value setting unit 50 causes the aircraft information acquisition unit 52 to calculate the relative position of the aircraft 1, causes the relative velocity calculation unit 54 to calculate the relative velocity of the aircraft 1 from the relative position of the aircraft 1 and the like, and causes the target instruction value calculation unit 56 to calculate the target instruction value θ0 from the relative velocity of the aircraft 1 and the like.

Aircraft Information Acquisition Unit

The aircraft information acquisition unit 52 acquires the attitude angle, aircraft velocity (Vx, Vy), aircraft acceleration (ax, ay), and position coordinate of the aircraft 1 acquired by the navigation device 20, the altitude of the aircraft 1 acquired by the altitude sensor 25, the position information of the center (Cx, Cy) of the target landing point 2 acquired by the image processing unit 32, and the like. In other words, the aircraft information acquisition unit 52 acquires information on the current state of the aircraft 1 and the position information of the target landing point 2.

Calculation of Relative Position

The aircraft information acquisition unit 52 calculates a relative position (Xhg, Yhg) (see FIG. 6) between the aircraft 1 and the target landing point 2. The aircraft information acquisition unit 52 calculates the relative position (Xhg, Yhg) on the basis of the center (Cx, Cy) of the marker 7 calculated by the image processing unit 32, the relative azimuth between the aircraft 1 and the vessel 5, and the altitude of the aircraft 1. Therefore, the image processing unit 32 and the aircraft information acquisition unit 52 function as the relative position acquisition unit to acquire the relative position (Xhg, Yhg) between the aircraft 1 and the target landing point 2. Hereinafter, the component in an X direction, which is the direction of the pitch axis, and the component in a Y direction, which is the direction of the roll axis, are expressed together, and the control quantity for each component is calculated by the guidance calculation unit 34. The relative azimuth between the aircraft 1 and the vessel 5 can be calculated based on the nose azimuth ψh of the aircraft 1 and the bow azimuth ψs of the vessel 5.

Figure 5:
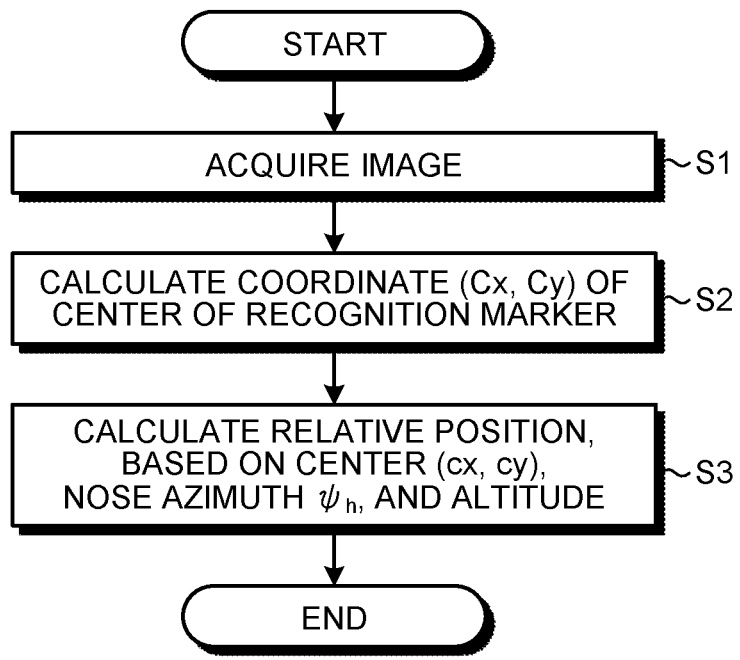
FIG. 5 is a flowchart expressing one example of a relative position calculation process performed by an image processing unit and an aircraft information acquisition unit.
Figure 6:
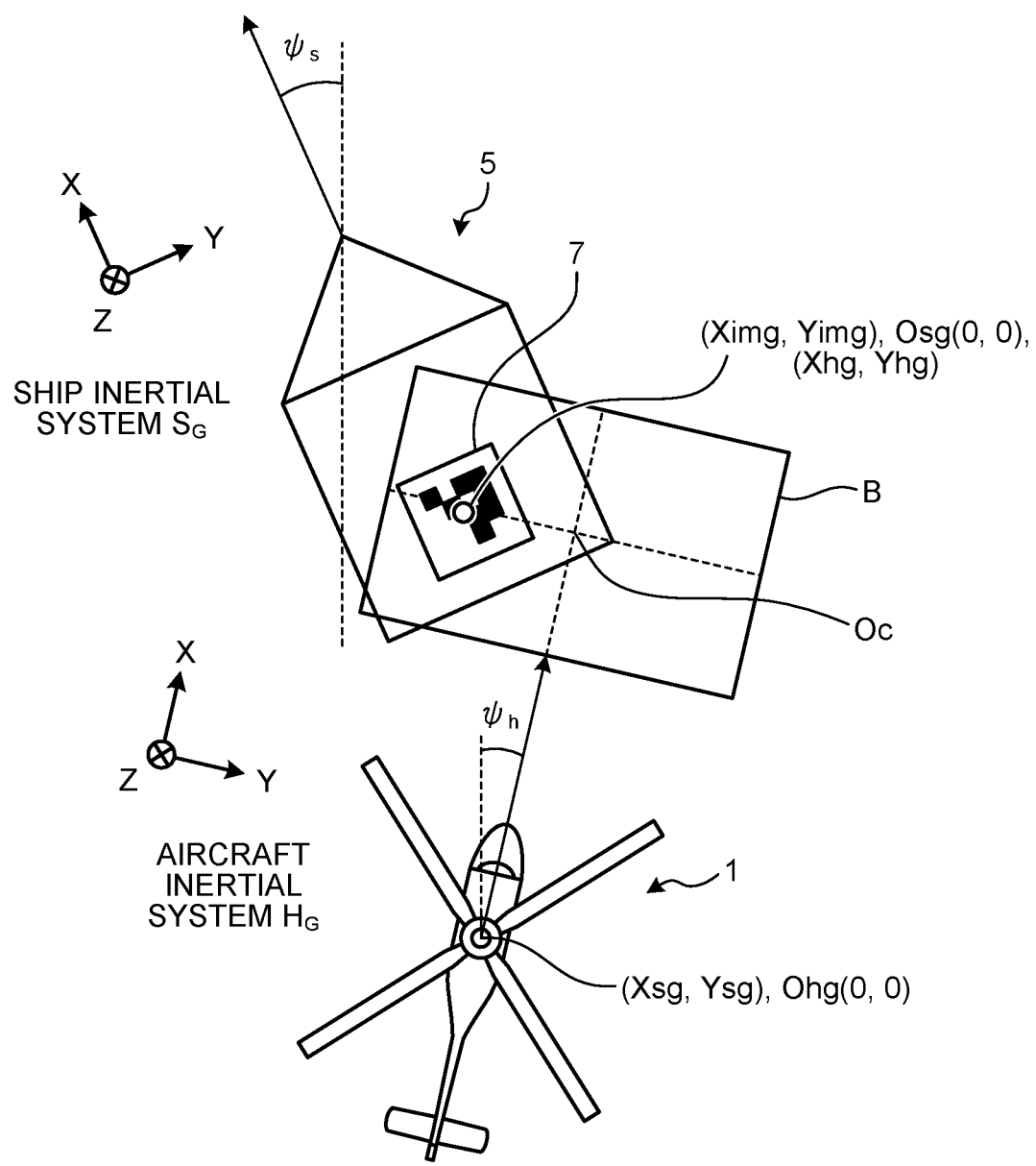
FIG. 6 is an explanatory diagram illustrating a state in which the aircraft is guided to the target landing point.

The aircraft information acquisition unit 52 executes a relative position calculation process to calculate the relative position (Xhg, Yhg) between the aircraft 1 and the target landing point 2. The relative position calculation process is performed by the image processing unit 32 and the guidance calculation unit 34 according to the procedure illustrated in FIG. 5. FIG. 5 is a flowchart expressing one example of the relative position calculation process performed by the image processing unit and the aircraft information acquisition unit. The flowchart in FIG. 5 is repeatedly performed every predetermined time by the image processing unit 32 and the aircraft information acquisition unit 52. FIG. 6 is an explanatory diagram illustrating a state in which the aircraft is guided to the target landing point. The calculation of the relative position between the aircraft 1 and the target landing point 2 in the horizontal direction with the marker 7 captured by the camera 10 will be described below. The relative altitude of the aircraft 1 to the target landing point 2 is calculated based on the altitude of the aircraft 1 detected by the altitude sensor 25, and is controlled as appropriate according to the relative position between the aircraft 1 and the target landing point 2 or the like. If the aircraft 1 and the vessel 5 are apart from each other to such a degree that the marker 7 cannot be captured by the camera 10, the aircraft 1 is flown toward the vessel 5 using, for example, each other's GPS location information.

The control unit 30 causes the image processing unit 32 to acquire images captured by the camera 10 (step S1). Next, the control unit 30 causes the image processing unit 32 to calculate the center (Cx, Cy) of the marker 7 in the camera fixed coordinate system (step S2). Specifically, as illustrated in FIG. 3, the image processing unit 32 specifies two diagonal lines Ld that extend between the corners of the marker 7 by image processing, and sets the intersection of the two specified diagonal lines Ld as the center (Cx, Cy) of the marker 7. The image processing unit 32 may specify only one diagonal line Ld and use the center position of the length of the specified diagonal line Ld as the center of the marker 7 (Cx, Cy). The image processing unit 32 may alternatively specify two or more diagonal lines Ld and use the position that is the average of the center positions of the lengths of the specified diagonal lines Ld as the center (Cx, Cy) of the marker 7. Furthermore, at the keystone correction of the square marker 7 using the function by projective transformation, the image processing unit 32 may calculate the center (Cx, Cy) of the square on the basis of the function. In this case, the keystone correction may be performed using the coordinate points at the four corners of the marker 7 or the coordinate points at the respective points of borders of black and white colors of the marker 7, while the other coordinate points may be calculated by interpolation.

Next, the control unit 30 causes the aircraft information acquisition unit 52 to calculate the relative position (Xhg, Yhg) between the aircraft 1 and the target landing point 2, based on the center (Cx, Cy) of the marker 7, the azimuth of the camera 10, i.e., the nose azimuth $\psi h$ of the aircraft 1, and the altitude of the aircraft 1 (relative altitude to the target landing point 2) (step S3). The relative position (Xhg, Yhg) is the distance between the aircraft 1 and the target landing point 2 in the horizontal direction. The process at step S3 may be performed in the image processing unit 32. Specifically, the aircraft information acquisition unit 52 first performs coordinate transformation of the center (Cx, Cy) of the marker 7 calculated by the image processing unit 32 into a target coordinate point (Ximg, Yimg) in the camera fixed coordinate system.

Next, the aircraft information acquisition unit 52 calculates a relative position (Xsg, Ysg) (see FIG. 6) between the aircraft 1 and the target landing point 2 in a ship inertial system Sg (see FIG. 6) on the basis of the following Equations (1) and (2). The ship inertia system Sg is a coordinate system in which the target landing point 2 is the origin Osg (0, 0), the direction along the bow azimuth $\psi s$ of the vessel 5 is the X axis, the direction orthogonal to the bow azimuth $\psi s$ in the horizontal direction is the Y axis, and the vertical direction is the Z axis.

$$\begin{bmatrix} Xsg \\ Ysg \end{bmatrix} = R_s \begin{bmatrix} -Ximg \\ -Yimg \end{bmatrix} \tag{1}$$

$$R_s = \begin{bmatrix} \cos(\psi_s) & \sin(\psi_s) \\ -\sin(\psi_s) & \cos(\psi_s) \end{bmatrix} \tag{2}$$

Next, the aircraft information acquisition unit 52 calculates the relative position (Xhg, Yhg) (see FIG. 6) between the aircraft 1 and the target landing point 2 in an aircraft inertial system Hg (see FIG. 6) on the basis of the following Equations (3) and (4). The aircraft inertial system Hg is a coordinate system in which the aircraft 1 is the origin Ohg (0, 0), the direction along the nose azimuth $\psi h$ of the aircraft 1 is the X axis, the direction orthogonal to the nose azimuth $\psi h$ in the horizontal direction is the Y axis, and the vertical direction is the Z axis. Thus, the relative position (Xhg, Yhg) between the aircraft 1 and the target landing point 2 in the aircraft inertial system in the horizontal direction is calculated. The relative position (Xhg, Yhg) is the distance from the aircraft 1 to the target landing point 2. The aircraft information acquisition unit 52 calculates the relative position between the aircraft 1 and the target landing point 2 in the manner described above; however, the method of calculating the relative position is not limited to this method.

$$\begin{bmatrix} Xhg \\ Yhg \end{bmatrix} = R_{sh}^T \begin{bmatrix} -Xsg \\ -Ysg \end{bmatrix} \tag{3}$$

$$R_{sh} = \begin{bmatrix} \cos(\psi_s - \psi_h) & \sin(\psi_s - \psi_h) \\ -\sin(\psi_s - \psi_h) & \cos(\psi_s - \psi_h) \end{bmatrix} \tag{4}$$

Calculation of Relative Altitude

The aircraft information acquisition unit 52 calculates the relative altitude to the target landing point 2 on the basis of the altitude of the aircraft 1. Therefore, the altitude sensor 25 and the aircraft information acquisition unit 52 function as a relative altitude acquisition unit to acquire the relative altitude between the aircraft 1 and the target landing point 2. When the relative altitude between the aircraft 1 and the vessel 5 is calculated by applying image processing to the image including the marker 7 photographed by the camera 10 in the image processing unit 32, the image processing unit 32 serves as the relative altitude acquisition unit.

Relative Velocity Calculation Unit

Figure 7:
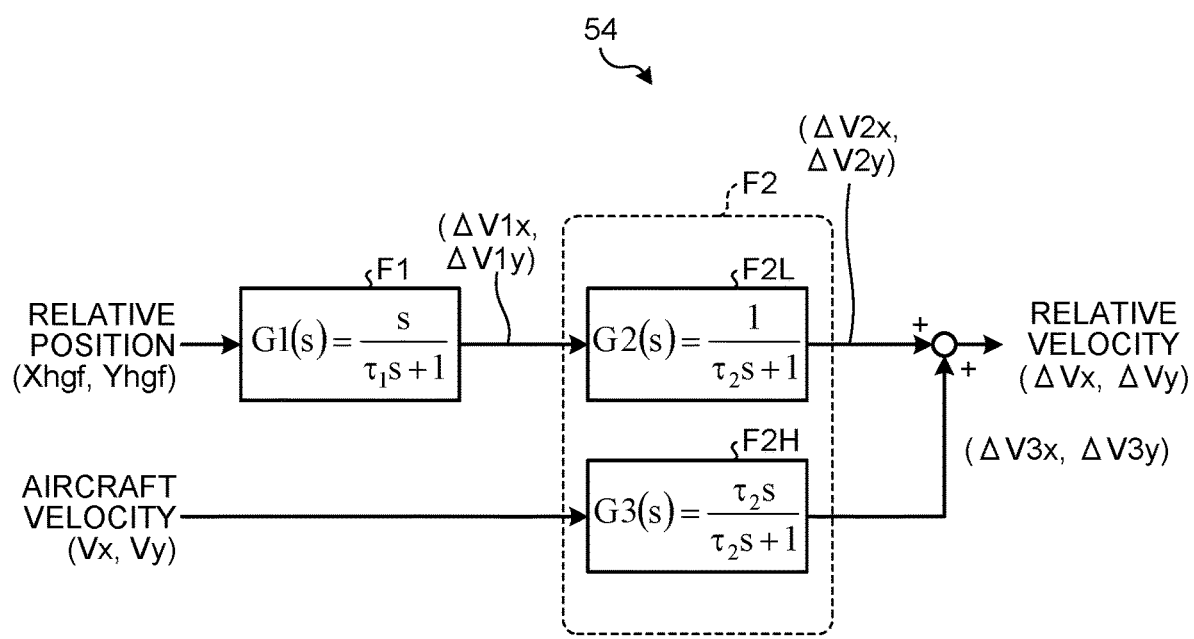
FIG. 7 is a block diagram illustrating one example of a relative velocity calculation process performed by a relative velocity calculation unit.

The relative velocity calculation unit 54 illustrated in FIG. 4 calculates the relative velocity ($\Delta Vx$, $\Delta Vy$) of the aircraft 1 relative to the target landing point 2, that is, the vessel 5. The relative velocity ($\Delta Vx$, $\Delta Vy$) is a parameter used to control the aircraft 1. FIG. 7 is a block diagram illustrating one example of a relative velocity calculation process performed by the relative velocity calculation unit. In FIG. 7, the component in the X direction, which is the direction of the pitch axis, and the component in the Y direction, which is the direction of the roll axis, are expressed together. Specifically, the relative velocity calculation unit 54 calculates the relative velocity ($\Delta Vx$, $\Delta Vy$) on the basis of the relative position (Xhg, Yhg) between the aircraft 1 and the target landing point 2 and the aircraft velocity (Vx, Vy) of the aircraft 1 detected by the navigation device 20.

The relative velocity calculation unit 54 first calculates relative velocity ($\Delta V1x$, $\Delta V1y$) between the aircraft 1 and the target landing point 2 by differentiating the relative position (Xhg, Yhg) between the aircraft 1 and the target landing point 2 as illustrated in FIG. 7. In this embodiment, pseudo-differentiation is applied to the relative position (Xhg, Yhg) using a pseudo-differential filter F1. A transfer function G1(S) of the pseudo-differential filter is expressed by the following Equation (5). In Equation (5), "s" is the operator and "$\tau 1$" is the time constant.

$$G1(S) = s/(\tau 1 \cdot s + 1) \tag{5}$$

If the relative velocity ($\Delta V1x$, $\Delta V1y$) calculated by the pseudo-differential filter F1 as in Equation (5) is used for later control, the controllability may deteriorate due to delay. Therefore, the relative velocity calculation unit 54 calculates the relative velocity (ΔVx, ΔVy) using a complementary filter F2, as illustrated in FIG. 7. The complementary filter F2 includes a low-pass filter F2L and a high-pass filter F2H.

The relative velocity calculation unit 54 applies the low-pass filter F2L to the relative velocity (ΔV1x, ΔV1y) calculated by the pseudo-differential filter F1 to calculate relative velocity (ΔV2x, ΔV2y) in which the frequency that is higher than or equal to a predetermined cutoff frequency is attenuated. A transfer function G2(s) of the low-pass filter F2L is expressed by Equation (6). In Equation (6), "s" is the operator and "τ2" is the time constant. The predetermined cutoff frequency is "1/τ2". Thus, the relative velocity (ΔV2x, ΔV2y) in which the relatively reliable and gentle changes in the relative velocity (ΔV1x, ΔV1y), that is, values in the low frequency range that is lower than or equal to the predetermined cutoff frequency is reflected can be obtained.

$$G2(S)=1/(\tau 2 \cdot s+1) \quad (6)$$

The relative velocity calculation unit 54 applies the high-pass filter F2H to the aircraft velocity (Vx, Vy) of the aircraft 1 detected by the navigation device 20 to calculate relative velocity (ΔV3x, ΔV3y) in which the frequency that is below the predetermined cutoff frequency is attenuated. A transfer function G3(s) of the high-pass filter F2H is expressed by Equation (7). In Equation (7), "s" is the operator and "τ2" is the time constant common to the low-pass filter F2L. Therefore, the predetermined cutoff frequency is "1/τ2" in the high-pass filter F2H as well. In other words, the short-term change of the relative velocity (ΔVx, ΔVy) is estimated to be caused by changes in aircraft velocity (Vx, Vy) of the aircraft 1 itself and the value obtained by applying the high-pass filter F2H to the aircraft velocity (Vx, Vy) is estimated to be the value in the high frequency range of the relative velocity (ΔVx, ΔVy). The guidance calculation unit 34 then calculates the value totaling the relative velocity (ΔV2x, ΔV2y) and the relative velocity (ΔV3x, ΔV3y) as the relative velocity (ΔVx, ΔVy). This makes it possible to accurately calculate the relative velocity (ΔVx, ΔVy) by taking into account the relative velocity (ΔV3x, ΔV3y) estimated to be the value in the high-frequency range in addition to the relative velocity (ΔV2x, ΔV2y), which is made more reliable by cutting off the values in the high frequency range.

$$G3(S)=\tau 2 \cdot s/(\tau 2 \cdot s+1) \quad (7)$$

The relative velocity (ΔVx, ΔVy) is calculated based on the relative position (Xhg, Yhg) between the aircraft 1 and the target landing point 2 as described above. Since the relative position is detected based on the detection values of the sensor (for example, camera 10) installed on the aircraft 1, it can be said that the relative velocity is also detected based on the detection values of the sensor (for example, camera 10) installed on the aircraft 1.

Calculation of Target Instruction Value

The target instruction value calculation unit 56 in FIG. 4 calculates the target instruction value θ0 on the basis of the relative position (Xhg, Yhg) calculated by the aircraft information acquisition unit 52 and the relative velocity (ΔVx, ΔVy) calculated by the relative velocity calculation unit 54. The target instruction value θ0 can be said to be the control quantity of the aircraft 1.

PID Control

Figure 8A:
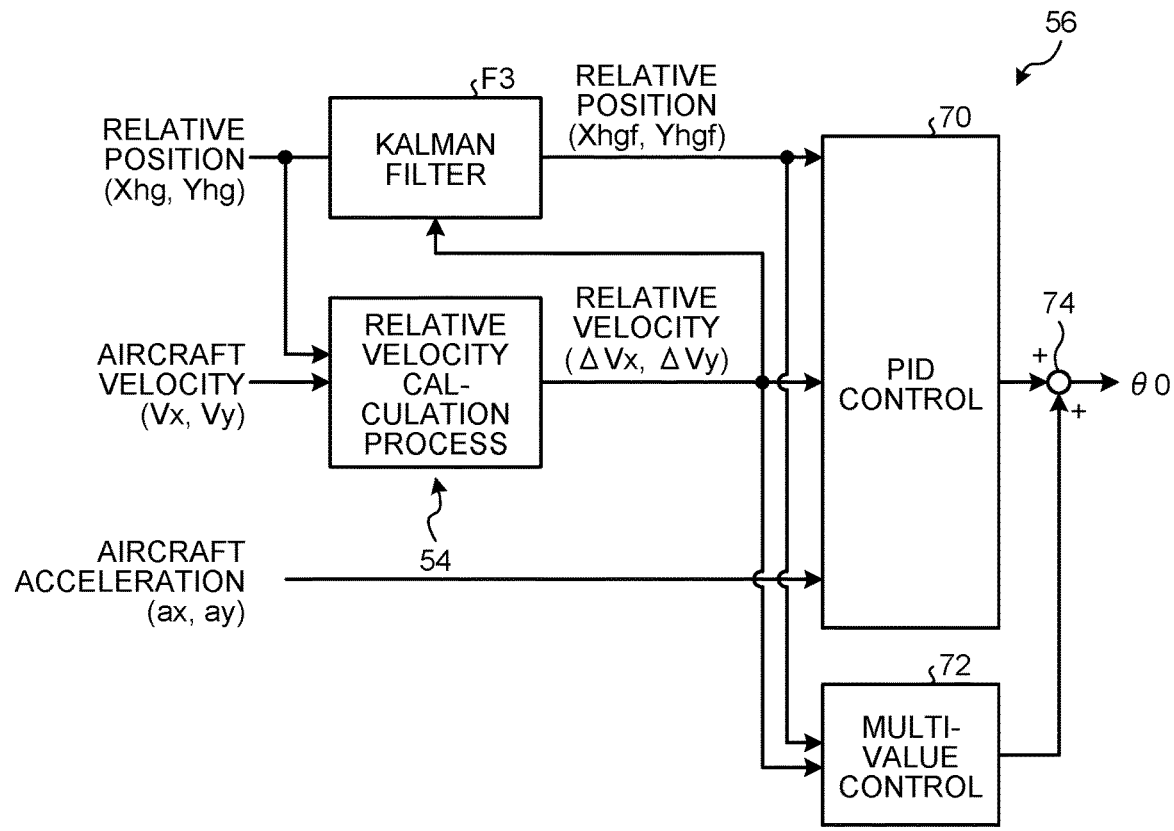
FIG. 8A is a block diagram illustrating one example of a configuration in which a control quantity calculation unit calculates a control quantity of the aircraft.

FIG. 8A is a block diagram illustrating one example of a configuration in which the control quantity calculation unit calculates the control quantity of the aircraft. As illustrated in FIG. 8A, the target instruction value calculation unit 56 applies a Kalman filter F3 to the relative position (Xhg, Yhg) and the relative velocity (ΔVx, ΔVy) to calculate a relative position (Xhgf, Yhgf) with noise removed and errors reduced. The Kalman filter F3 may be omitted. Then, the target instruction value calculation unit 56 calculates a target instruction value θ0' by causing a PID control unit 70 (feedback control unit) to perform PID control using the relative position (Xhgf, Yhgf), the relative velocity (ΔVx, ΔVy), and the aircraft acceleration (ax, ay). Specifically, the target instruction value calculation unit 56 calculates the target instruction value θ0' of the aircraft 1 by the PID control so that the relative position (Xhgf, Yhgf) as the distance in the horizontal direction between the aircraft 1 and the target landing point 2 becomes the value θ. Therefore, the target instruction value θ0' can be determined so that the aircraft 1 is guided to the target landing point 2 and the aircraft 1 becomes stationary relative to the vessel 5 directly above the target landing point 2. The target instruction value calculation unit 56 calculates the target instruction value θ0' of the aircraft 1 by the PID control so that the relative velocity (ΔVx, ΔVy) and the aircraft acceleration (ax, ay) become the value θ. Accordingly, the accuracy regarding the guidance of the aircraft 1 to the target landing point 2 can be improved. In this embodiment, the PID control is based on the aircraft acceleration (ax, ay); however, it is only necessary that the PID control is performed based at least on the relative position and relative velocity between the aircraft 1 and the target landing point 2.

The target instruction value calculation unit 56 may not perform an integral operation of the PID control when the relative velocity (ΔVx, ΔVy) is a predetermined value or more. In this embodiment, when the aircraft 1 is stationary relative to the target landing point 2, the gain of the integral operation of the PID control is set comparatively high considering the canceling of the force that the aircraft 1 receives from the surrounding wind. Here, when the wind force against the aircraft 1 weakens, the aircraft 1 may temporarily move from the relative stationary state, get balanced at any position against the wind force, and then become stationary again. At this time, the target instruction value θ0' for returning the aircraft 1 to the target landing point 2 is calculated by the integral operation of the PID control. Therefore, the integral operation of the PID control is a necessary configuration; however, as described above, since the gain is set comparatively high, the value calculated by the integral operation becomes too large when the relative velocity (ΔVx, ΔVy) is high, in which case overshoot may occur, that is, the aircraft 1 may pass the target landing point 2. In view of this, when the relative velocity (ΔVx, ΔVy) is a predetermined value or more, the integral operation of the PID control is not performed; thus, overshoot can be suppressed even when the integral gain is set comparatively high.

Although the target instruction value calculation unit 56 calculates the target instruction value θ0' by the PID control in this manner, the target instruction value calculation unit 56 may calculate the target instruction value θ0' by the P control, the PI control, the PD control, or the like instead of the PID control.

Multi-Value Control

Furthermore, in parallel with the PID control, the target instruction value calculation unit 56 executes the multi-value control of setting an additional value D to be added to the target instruction value θ0' calculated by the PID control unit 70 in a multi-value control unit 72. To the multi-value control unit 72, the relative position (Xhgf, Yhgf) and the relative velocity (ΔVx, ΔVy) are input. The multi-value control unit 72 calculates the additional value D on the basis of the input relative position (Xhgf, Yhgf) and relative velocity ($\Delta$Vx, $\Delta$Vy).

Figure 8B:
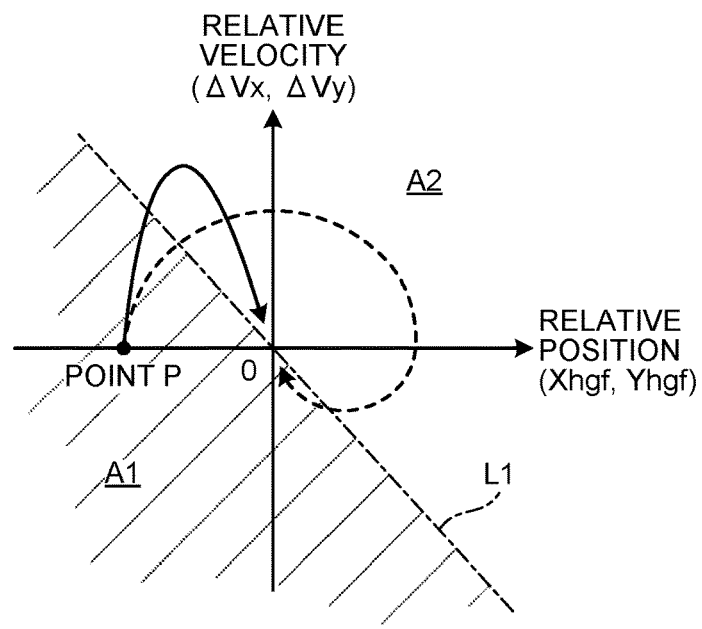
FIG. 8B is an explanatory diagram illustrating a coordinate plane with the relative position and relative velocity as orthogonal axes.

FIG. 8B is an explanatory diagram illustrating a coordinate plane with the relative position and the relative velocity as orthogonal axes. The relative position (Xhgf, Yhgf) is on the horizontal axis and the relative velocity ($\Delta$Vx, $\Delta$Vy) is on the vertical axis. In FIG. 8B, the component in the X direction, which is the direction of the pitch axis, and the component in the Y direction, which is the direction of the roll axis, are expressed together. The relative position (Xhgf, Yhgf) here is the distance from the aircraft 1 to the target landing point 2, and is regarded as being positive (rightward) when the aircraft 1 is ahead of the target landing point 2 in a direction where the aircraft 1 advances and negative (leftward) when the aircraft 1 is behind the target landing point 2 in the direction where the aircraft 1 advances. The relative velocity ($\Delta$Vx, $\Delta$Vy) here is regarded as being positive (upward) when the aircraft velocity (Vx, Vy) of the aircraft 1 is higher than the velocity of the vessel 5 and negative (downward) when the aircraft velocity (Vx, Vy) of the aircraft 1 is lower than the velocity of the vessel 5. Thus, the origin on the coordinate plane represents the coordinate point at which the aircraft 1 is directly above the target landing point 2 and is stationary relative to the target landing point 2. The relative position (Xhgf, Yhgf) and the relative velocity ($\Delta$Vx, $\Delta$Vy) may be considered opposite in terms of positive and negative. FIG. 8B also illustrates an example of a coordinate point P at the current relative position (Xhgf, Yhgf) and relative velocity ($\Delta$Vx, $\Delta$Vy).

On the coordinate plane, a switching line L1 passing the origin and sectioning a velocity increasing region A1 (shaded range in FIG. 8B) where the relative velocity ($\Delta$Vx, $\Delta$Vy) is increased and a velocity decreasing region A2 (non-shaded range in FIG. 8B) where the relative velocity ($\Delta$Vx, $\Delta$Vy) is decreased is set in advance. The switching line L1 is a line on the coordinate plane, passing the origin and extending in a quadrant in which the aircraft velocity (Vx, Vy) of the aircraft 1 is higher than the velocity of the vessel 5 (the velocity of the target landing point 2) and the aircraft 1 is behind the target landing point 2 in the advancing direction, and a quadrant in which the aircraft velocity (Vx, Vy) of the aircraft 1 is lower than the velocity of the vessel 5 and the aircraft 1 is ahead of the target landing point 2 in the advancing direction. Thus, in this embodiment, the switching line L1 passes the origin and extends in the second and fourth quadrants, as illustrated in FIG. 8B. The angle of the switching line L1 is not limited to that illustrated in FIG. 8B, and can be set by a user as appropriate. For example, if the angle of the switching line L1 is increased (the line is tilted toward the relative velocity side), the aircraft velocity (Vx, Vy) of the aircraft 1 returning to the target landing point 2 will increase, but overshoot is more likely to occur, so the angle is set to be appropriate.

Figure 8C:
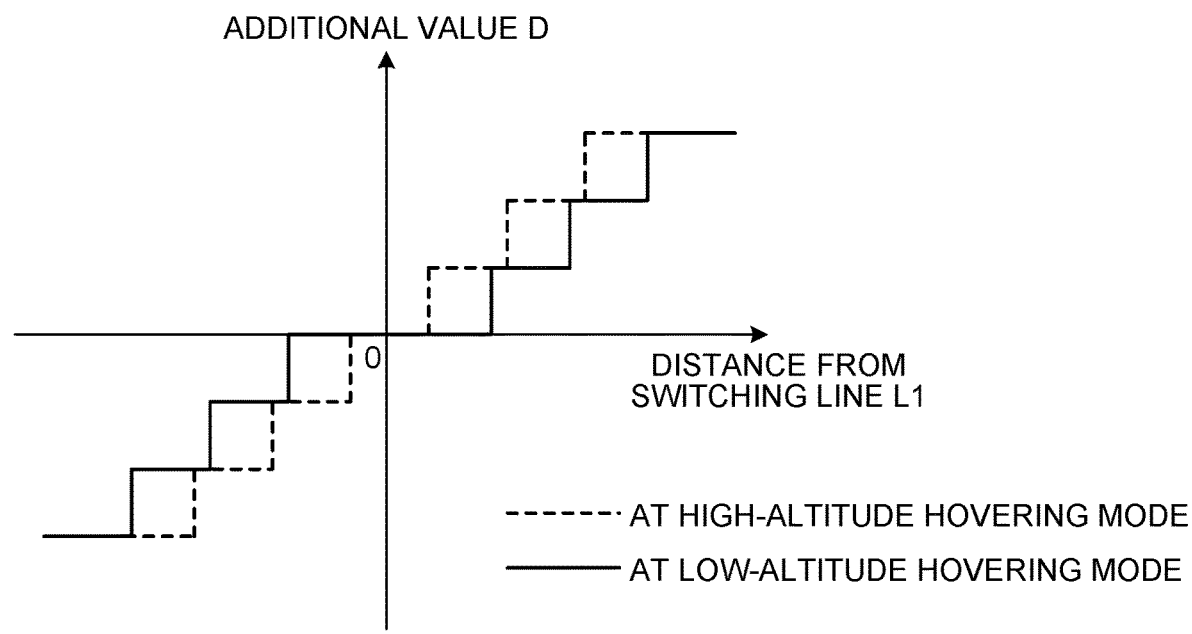
FIG. 8C is an explanatory diagram illustrating one example of a map that defines an additional value set in multi-value control.

FIG. 8C is an explanatory diagram illustrating one example of a map that defines the additional value set in the multi-value control. In FIG. 8C, the horizontal axis represents the distance from the switching line L1 to the current coordinate point P on the coordinate plane in FIG. 8B, and the vertical axis represents the additional value D to be set. The distance from the switching line L1 to the current coordinate point P is positive when the current coordinate point P is located in the velocity increasing region A1 and negative when the current coordinate point P is located in the velocity decreasing region A2. In this embodiment, the additional value D, when positive, is set to tend to increase the relative velocity ($\Delta$Vx, $\Delta$Vy), i.e., to increase the velocity of the aircraft 1 in the advancing direction. When the additional value D is negative, it is set to tend to decrease the relative velocity ($\Delta$Vx, $\Delta$Vy), i.e., to decrease the velocity of the aircraft 1 in the advancing direction or to increase the velocity in the backward direction in this embodiment. As indicated by a solid line in the drawing, the additional value D is set stepwise so that the absolute value increases as the distance between the coordinate point P and the switching line L1 is larger, and the absolute value decreases as the distance between the coordinate point P and the switching line L1 is smaller.

The multi-value control unit 72 sets the additional value D illustrated in FIG. 8C in accordance with the distance between the switching line L1 and the coordinate point P of the current relative position (Xhgf, Yhgf) and relative velocity ($\Delta$Vx, $\Delta$Vy), and an addition circuit 74 adds the additional value D to the target instruction value $\theta 0'$ calculated in the PID control unit 70 as illustrated in FIG. 8A, thereby obtaining the target instruction value $\theta 0$.

Therefore, when the coordinate point P is located in the velocity increasing region A1, the flight of the aircraft 1 is controlled with the target instruction value $\theta 0$ to which the additional value D with a tendency to increase the relative velocity ($\Delta$Vx, $\Delta$Vy) is added. As a result, as indicated by a solid line in FIG. 8B, the relative velocity ($\Delta$Vx, $\Delta$Vy) becomes higher than when the aircraft 1 flies at the target instruction value $\theta 0'$ without the addition of the additional value D illustrated with a dashed line in FIG. 8B. In other words, the aircraft velocity (Vx, Vy) of the aircraft 1 increases quickly and the time required to travel the same distance is reduced. On the other hand, when the coordinate point P crosses the switching line L1 and reaches the velocity decreasing region A2, the flight of the aircraft 1 is controlled with the target instruction value $\theta 0$ to which the additional value D with a tendency to decrease the relative velocity ($\Delta$Vx, $\Delta$Vy) is added. Accordingly, as indicated by the solid line in FIG. 8B, the relative velocity ($\Delta$Vx and $\Delta$Vy) of the solid line becomes larger than the relative velocity of the dashed line immediately after transiting to the velocity decreasing region A2 over the switching line L1 from the velocity increasing region A1, but becomes smaller than the dashed line toward the target landing point 2. In other words, the aircraft velocity (Vx, Vy) of the aircraft 1 decreases quickly, and the overshooting of the aircraft 1 passing the origin on the coordinate plane is suppressed.

A plurality of the additional values D may be set depending on the altitude of the aircraft 1 (relative altitude to the target landing point 2). For example, when the aircraft 1 exists right above the target landing point 2 and the altitude is predetermined altitude (for example, in the range of 3 m or more and 8 m or less relative to the target landing point 2) (for example, at a low-altitude hovering mode described below), the additional value D may be set as indicated by a dashed line in FIG. 8C so that the absolute value is larger than the value at the normal time indicated by the solid line (for example, at a high-altitude hovering mode described below). In this case, the setting of the additional value D may be changed gradually according to the value of the altitude. This allows the target instruction value $\theta 0$ of the aircraft 1 to be calculated with higher accuracy in the vicinity of the aircraft 1 landing at the target landing point 2, enabling the aircraft 1 to land at the target landing point 2 accurately.

Similarly, the additional values D may be set depending on the control mode of the aircraft 1. For example, the following modes are considered as the control mode for the aircraft 1: the high-altitude hovering mode in which the relative altitude to the target landing point 2 is kept a first relative altitude (for example 8 m) right above the target landing point 2, and the low-altitude hovering mode in which the relative altitude to the target landing point 2 is lowered from the high-altitude hovering mode to a second relative altitude (for example, 3 m) right above the target landing point 2. The shift from the high-altitude hovering mode to the low-altitude hovering mode can be performed under a condition that the relative position (Xhgf, Yhgf) is less than or equal to a predetermined threshold and an operator instructs the mode shift. The shift from the high-altitude hovering mode to the low-altitude hovering mode may be performed under a condition that the attitude rate of the aircraft 1, the attitude angle, the relative velocity (ΔVx, ΔVy), the angle of the target landing point 2 in the horizontal direction, the altitude of the aircraft 1 to the target landing point 2, the relative altitude to the target landing point 2, or the like is less than or equal to a predetermined value, instead of the operator's instruction for the mode shift.

In the case where these high-altitude hovering mode and low-altitude hovering mode are set, the setting of the additional value D is switched after a first predetermined time (for example, 5 seconds) from the start of the shift from the high-altitude hovering mode to the low-altitude hovering mode. In other words, the additional value D is changed from the value indicated by the solid line in FIG. 8C to the value indicated by the dashed line in FIG. 8D. Here, the additional value D may be set to gradually change over a second predetermined time (for example, 3 seconds). This allows the target instruction value θ0 of the aircraft 1 to be calculated with higher accuracy in the vicinity of the aircraft 1 landing at the target landing point 2, enabling the aircraft 1 to land at the target landing point 2 accurately.

Figure 8D:
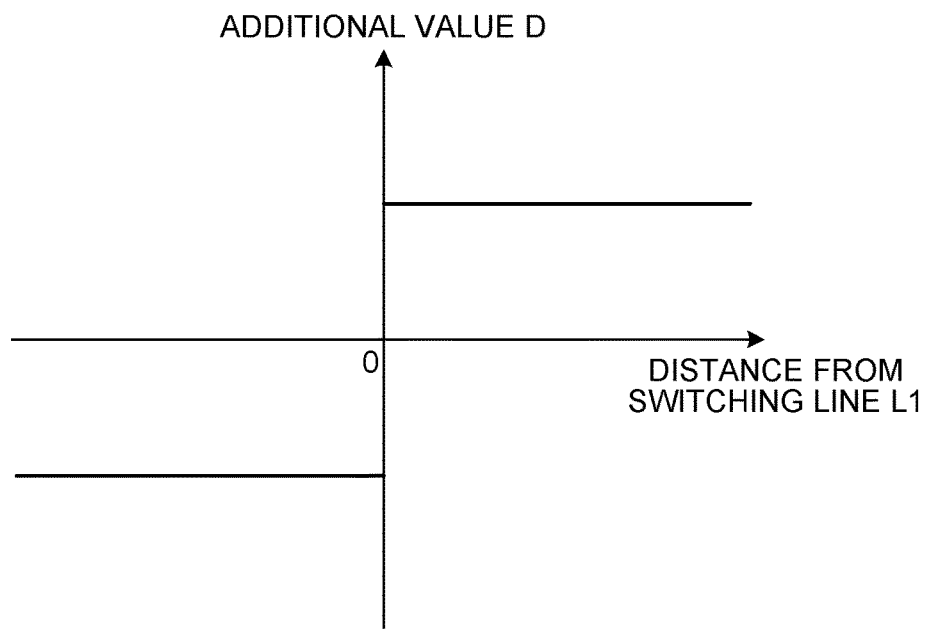
FIG. 8D is an explanatory diagram illustrating another example of the map that defines the additional value set in the multi-value control.

The method of setting the additional value D is not limited to this. FIG. 8D is an explanatory diagram illustrating another example of the map that defines the additional values set in the multi-value control. As illustrated in the drawing, the additional value D may be a constant value of a positive value in the velocity increasing region A1 and a constant value of a negative value in the velocity decreasing region A2, regardless of the distance between the current coordinate point P and the switching line L1.

As described above, the target instruction value calculation unit 56 adds the additional value D calculated by the multi-value control unit 72 to the target instruction value θ0' calculated by the PID control unit 70, thereby calculating the target instruction value θ0. However, the method of calculating the target instruction value θ0 is not limited to this. For example, the target instruction value calculation unit 56 may use the target instruction value θ0' calculated by the PID control unit 70 without using the additional value D as the target instruction value θ0.

Correction Target Instruction Value

In a case where the aircraft 1 is controlled using the target instruction value θ0 calculated as described above, the aircraft 1 may not be controlled properly due to a disturbance, such as gust, occurring against the aircraft 1. In contrast to this, in the present embodiment, the correction target instruction value setting unit 60 illustrated in FIG. 4 calculates an estimated disturbance quantity representing the estimated quantity of disturbance, a correction target instruction value calculation unit 66 corrects the target instruction value θ0 on the basis of the estimated disturbance quantity to calculate the correction target instruction value θ, and thus, the aircraft 1 is controlled with the correction target instruction value θ as the actual control quantity. This allows the aircraft 1 to be properly controlled even in the occurrence of a disturbance. A method of calculating the estimated disturbance quantity and the correction target instruction value θ is described below.

Correction Target Instruction Value Setting Unit

Figure 9:
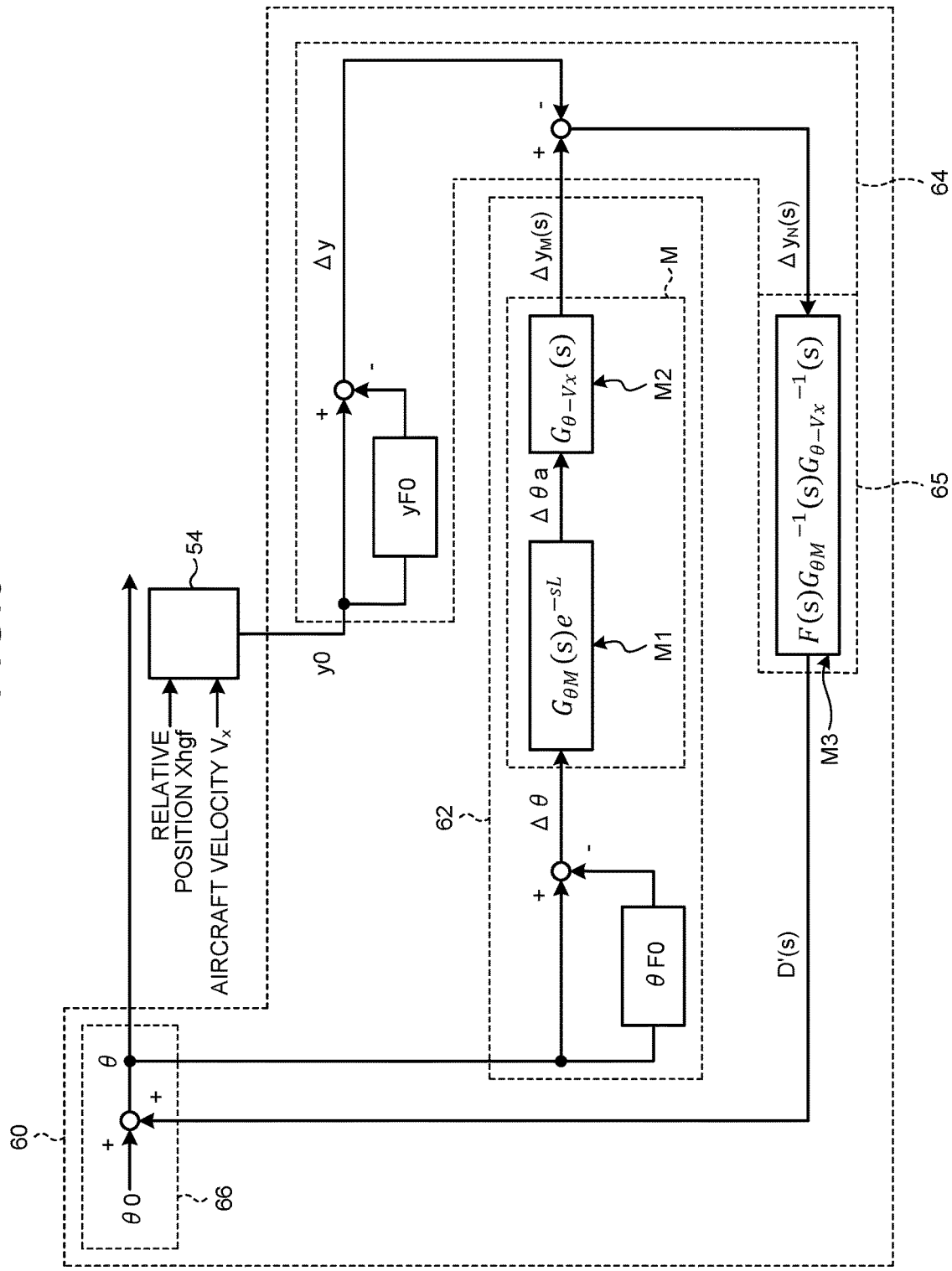
FIG. 9 is a schematic block diagram for describing a calculation method for a correction target instruction value.

As illustrated in FIG. 4, the correction target instruction value setting unit 60 includes a reference velocity calculation unit 62, an estimated disturbance quantity calculation unit 64, a correction command calculation unit 65, and the correction target instruction value calculation unit 66. FIG. 9 is a schematic block diagram for describing a calculation method for the correction target instruction value. The calculation method for the correction target instruction value θ is described below based on FIG. 9. In the example described below, the correction target instruction value θ(target instruction value θ0) is the target value for the attitude angle in the pitch direction. The reference signs in FIG. 9 indicate the entities that execute the respective processes.

Calculation of Correction Target Instruction Value

As illustrated in FIG. 9, the correction target instruction value calculation unit 66 corrects the target instruction value θ0 calculated by the method described above with a correction command d'(s) previously calculated by the correction command calculation unit 65, thereby calculating the correction target instruction value θ. The correction command d'(s), which is described below, is a value calculated based on the estimated disturbance quantity. The correction target instruction value calculation unit 66 corrects the acquired target instruction value θ0 with the correction command d'(s) calculated immediately before. In this embodiment, the correction target instruction value calculation unit 66 calculates the correction target instruction value θ by adding the correction command d'(s) to the target instruction value θ0; however, the method of correcting the target instruction value θ0 with the correction command d'(s) is not limited to addition. In other examples, the target instruction value θ0 may be subtracted by the correction command d'(s) to calculate the correction target instruction value θ or the gain or filter may be applied to the correction command d'(s) and the target instruction value θ0 may be added or subtracted by the correction command d'(s) with the gain or filter applied thereto, thereby calculating the correction target instruction value θ. If there is no previously calculated correction command d'(s), that is, the correction command d'(s) is calculated for the first time, for example, the target instruction value θ0 may be treated as the correction target instruction value θ.

Calculation of Reference Velocity

The reference velocity calculation unit 62 calculates a differential value Δθ between the correction target instruction value θ and an initial target instruction value θF0. The initial target instruction value θF0 is the value of the correction target instruction value θ that is calculated before the correction command d'(s) is calculated at this timing and stored in a storage unit (not illustrated), and can be said to be the stored quantity of the correction target instruction value θ. The initial target instruction value θF0 is the correction target instruction value θ when the correction command d'(s) is first calculated. In other words, in this example, the differential value Δθ is the differential value between the target value for the attitude in the pitch direction this time and the target value for the attitude in the pitch direction when the correction command d'(s) was first calculated. Since the differential value Δθ is the value calculated in this way, this value can be said to be a value based on the target instruction value θ0. The initial target instruction value θF0 is not limited to the correction target instruction value θ when the correction command d'(s) was first calculated, and may alternatively be the correction target instruction value θ at any timing prior to this time, or may be a preset constant value.

The differential value Δθ is used as an input value for a reference model M. The reference velocity calculation unit 62 calculates the reference velocity, which is the reference value of the aircraft velocity (inertial velocity) of the aircraft 1, by inputting the differential value Δθ as the input value to the reference model M, which is set in advance. However, the input value of the reference model M is not limited to being the differential value θθ. The input value of the reference model M may be, for example, the correction target instruction value θ, which is used as the actual control quantity of the aircraft 1.

The reference model M is a model in which the internal control law and motion model of the aircraft are treated as unknown in this embodiment, and the reference velocity, which is the output value, is uniquely set according to the differential value Δθ that is the input value. More specifically, the reference model M is a model in which the observation value (prediction value) of the aircraft velocity of the aircraft 1 when the correction target instruction value θ (differential value Δθ) is set is calculated as the reference velocity. In this embodiment, the reference model M is set based on the actual measurement value of the relation between the target instruction value θ0 (differential value Δθ) and the aircraft velocity of the aircraft 1 in the absence of the disturbance. By constructing the reference model M on the basis of the actual measurement value, the actual behavior can be reproduced with high accuracy even if the internal control law and motion model are unknown.

In this embodiment, a first reference model M1 and a second reference model M2 are used as the reference model M. The first reference model M1 is a model that takes the differential value Δθ, here the differential value of the target value for the attitude in the pitch direction as the input value and in which a reference value Δθ $a$ of the attitude of the aircraft 1 is uniquely set as the output value. The reference value Δθ $a$ of the attitude of the aircraft 1 represents the prediction value for the attitude that the aircraft 1 actually has when the differential value Δθ is set, and more specifically represents the product obtained by multiplying the first reference model M1 by the difference between the aircraft attitude when the correction target instruction value θ is set and the aircraft attitude when the initial target instruction value θF0 is set. In other words, the first reference model M1 is a model in which the observation value (prediction value) of the attitude of the aircraft 1 when the target instruction value θ0 (differential value Δθ) is set is calculated as the reference value Δθ $a$ of the attitude of the aircraft 1.

The first reference model M1 includes the element of the time delay of the change of the reference value Δθ $a$ with respect to the change of the differential value Δθ. The time delay here refers to the time from when the differential value Δθ changes until the attitude of the aircraft 1 begins to change in response to that change. That is to say, when the differential value Δθ, which is the input value, is input to the first reference model M1, the reference value Δθ $a$ is calculated so that the change in the reference value Δθ $a$ of the attitude of the aircraft 1 is delayed with respect to the change in the differential value Δθ on the basis of the time delay. Since the attitude and aircraft velocity that the aircraft 1 can actually have are delayed with respect to the change of the target value for the attitude, the reference velocity can be calculated with high accuracy by including the element of the time delay. Thus, since the first reference model M1 includes the element of the time delay, it can be said that the reference model M includes the element of the time delay for the change of the output value relative to the change of the input value.

In this embodiment, the first reference model M1 is set based on the actual measurement value of the relation between the target instruction value θ0 and the observation value for the attitude of the aircraft 1. In the example in FIG. 8, the first reference model M1 is represented as $G_{\theta M}(s)e^{-sL}$. For example, $G_{\theta M}(s)$, which is the portion of the first reference model M1 excluding the time delay element, $e^{-sL}$, is set, for example, as in Equation (8) below. In Equation (8), s is the operator, we refers to the natural frequency [rad/s], which is an eigenvalue, for example, 4 [rad/s], and $\zeta_\theta$ is the damping factor, for example, 0.7.

$$G_{\theta M}(s)=\omega_\theta^2/(s^2+2\zeta_\theta\omega_\theta s+\omega_\theta^2) \qquad (8)$$

The first reference model M1 is $G_{\theta M}(s)$ set as in Equation (8) to which the time delay element, $e^{-sL}$, is added. However, the first reference model M1 in Equation (8) is one example, and the first reference model M1 may be modeled in any way so as to output the reference value Δθ $a$ of the attitude of the aircraft 1 when the differential value Δθ is input.

The second reference model M2 is represented as $G_\theta$-Vx(s) in the example in FIG. 8. The second reference model M2 is a model that takes the reference value Δθ $a$ of the attitude of the aircraft 1, which is the output value of the first reference model M1, as the input value and in which the reference value of the aircraft velocity of the aircraft 1, that is, the reference velocity is uniquely set. In other words, the second reference model M2 is an equation that converts the attitude of the aircraft 1 into the aircraft velocity. The second reference model M2 may be set in any method.

The reference velocity calculation unit 62 calculates the reference velocity using the first reference model M1 and the second reference model M2 that are set in this manner. The first reference model M1 and the second reference model M2 are stored in advance in the control system 100, for example, and the reference velocity calculation unit 62 reads out the first reference model M1 and the second reference model M2 to calculate the reference velocity. Specifically, the reference velocity calculation unit 62 inputs the differential value Δθ between the correction target instruction value θ and the initial target instruction value θF0 to the first reference model M1 and calculates the reference value Δθ $a$ of the attitude of the aircraft 1 as the output value. The reference velocity calculation unit 62 calculates the reference velocity by inputting the reference value Δθ $a$ of the attitude of the aircraft 1, which is the output value of the first reference model M1, into the second reference model M2. The reference velocity calculated by the reference velocity calculation unit 62 is hereinafter referred to as reference velocity $\Delta y_M(s)$ as appropriate.

Calculation of Relative Velocity

On the other hand, the relative velocity calculation unit 54 calculates the relative velocity y0. The relative velocity y0 corresponds to the relative velocity (ΔVx, ΔVy) of the aircraft 1 described above. The relative velocity calculation unit 54 calculates the relative velocity y0 (relative velocity (ΔVx, ΔVy)) using the calculation method for the relative velocity described above.

The estimated disturbance quantity calculation unit 64 converts the relative velocity y0 to the aircraft velocity of the aircraft 1 based on a certain point in time. In other words, the relative velocity y0 of the aircraft 1 relative to the target landing point 2 is converted to the inertial velocity of the aircraft 1. In this embodiment, the estimated disturbance quantity calculation unit 64 converts the relative velocity to the aircraft velocity based on a certain point in time by calculating the differential value between the relative velocity y0 and the initial relative velocity yF0 as the aircraft velocity Δy. The initial relative velocity yF0 is the relative velocity y0 when the correction command d'(s) is first calculated, and is the value of the relative velocity y0 calculated and stored in the storage unit (not illustrated) before the correction command d'(s) is calculated at this time, and can also be said to be the stored quantity of the relative velocity y0. The estimated disturbance quantity calculation unit 64, for example, determines that the attitude and velocity of the aircraft 1 are stable when the correction command d'(s) is first calculated and that the velocity of the target landing point 2 (vessel 5) is constant, and the differential value between the relative velocity y0 and the initial relative velocity yF0 is the aircraft velocity Δy. That is to say, the relative velocity y0 is the differential value between the current aircraft velocity of the aircraft 1 and the current velocity of the vessel 5 and the initial relative velocity yF0 is the differential value between the aircraft velocity of the aircraft 1 and the velocity of the vessel 5 at the initial (certain) time; therefore, by the determination as described above, the term of the velocity of the vessel 5 is cancelled and the aircraft velocity Δy can be calculated as the difference between the current aircraft velocity of the aircraft 1 and the initial aircraft velocity of the aircraft 1.

Calculation of Estimated Disturbance Quantity After the reference velocity $\Delta y_M(s)$ and the aircraft velocity Δy are calculated as described above, the estimated disturbance quantity calculation unit 64 calculates an estimated disturbance quantity $\Delta y_N(s)$ acting on the aircraft 1 on the basis of the difference between the reference velocity $\Delta y_M(s)$ and the aircraft velocity Δy. That is to say, the estimated disturbance quantity calculation unit 64 calculates the estimated disturbance quantity $\Delta y_N(s)$ on the basis of the difference between the reference velocity $\Delta y_M(s)$ and the aircraft velocity Δy, assuming that the amount of deviation of the actual aircraft velocity Δy of the aircraft 1 from the reference velocity $\Delta y_M(s)$, which is the prediction value of the aircraft velocity of the aircraft 1, is due to the disturbance. Since the aircraft velocity Δy is calculated from the relative velocity y0, it can be said that the estimated disturbance quantity calculation unit 64 calculates the estimated disturbance quantity $\Delta y_N(s)$ on the basis of the difference between the reference velocity $\Delta y_M(s)$ and the relative velocity y0.

Specifically, the estimated disturbance quantity calculation unit 64 calculates the differential value between the reference velocity $\Delta y_M(s)$ and the aircraft velocity Δy as the estimated disturbance quantity $\Delta y_N(s)$. The estimated disturbance quantity $\Delta y_N(s)$ can be said to be the differential value between the prediction value of the aircraft velocity and the actual aircraft velocity.

Calculation of Correction Command

The correction command calculation unit 65 calculates the correction command d'(s) on the basis of the estimated disturbance quantity $\Delta y_N(s)$. Therefore, the correction command d'(s) can be said to be a value representing the estimated disturbance quantity acting on the aircraft 1. The correction command calculation unit 65 calculates the correction command d'(s) by inputting the estimated disturbance quantity $\Delta y_N(s)$ into a model M3. The model M3 is a model that converts the parameter of the estimated disturbance quantity $\Delta y_N(S)$ from the aircraft velocity to the parameter of the target instruction value θ0 (here, the attitude angle in the pitch direction). In other words, the correction command calculation unit 65 calculates the correction command d'(s) by converting the parameter of the estimated disturbance quantity $\Delta y_N(s)$ into the parameter of the target instruction value θ0. In the example in FIG. 9, the model M3 is represented as F (s) $G_{\theta M}^{-1}(s)G_\theta\text{-}Vx^{-1}(s)$. In other words, the model M3 is the inverse function of the reference model M and can be said to be an equation that converts the parameter converted to the aircraft velocity by the reference model M back to the parameter of the target instruction value θ0.

The correction command calculation unit 65 thus calculates the correction command d'(s), which is the estimated disturbance quantity converted to the parameter of the target instruction value θ0. When calculating the target instruction value θ0 next, the correction target instruction value calculation unit 66 corrects the target instruction value θ0 with the previously calculated correction command d'(s), that is, excludes the influence of the disturbance from the target instruction value θ0 and the correction command calculation unit 65 updates the correction command d'(s). By continuing to update the correction command d'(s) in this manner, control can be performed while correcting the disturbance quickly.

In the above example, the parameter of the target instruction value θ0 is described as the attitude angle in the pitch direction; however, the parameter of the target instruction value θ0 is not limited to the attitude angle in the pitch direction. A limiter may be set on the correction command d'(s). In other words, an upper limit value may be set for the correction command d'(s), and if the calculated correction command d'(s) is greater than or equal to the upper limit value, the set upper limit value may be used as the correction command d'(s).

Flight Control Unit

The flight control unit 36 controls each component of the aircraft 1 to fly the aircraft 1 according to the correction target instruction value θ calculated as above, that is, by using the correction target instruction value θ as the control quantity. The flight control unit 36 controls the blade pitch angle, rotation velocity, etc. of each rotor blade according to the correction target instruction value θ, so as to adjust the aircraft velocity (Vx, Vy), attitude angle, attitude rate, etc. of the aircraft 1. The aircraft 1 is thereby guided to the target landing point 2. Although the image processing unit 32 and the guidance calculation unit 34 are described in this embodiment as functional units separate from the flight control unit 36, the flight control unit 36, the image processing unit 32, and the guidance calculation unit 34 may be an integral functional unit. In other words, the process in the image processing unit 32 and the guidance calculation unit 34 may be performed in the flight control unit 36.

Procedure of Calculating Correction Target Instruction Value

Figure 10:
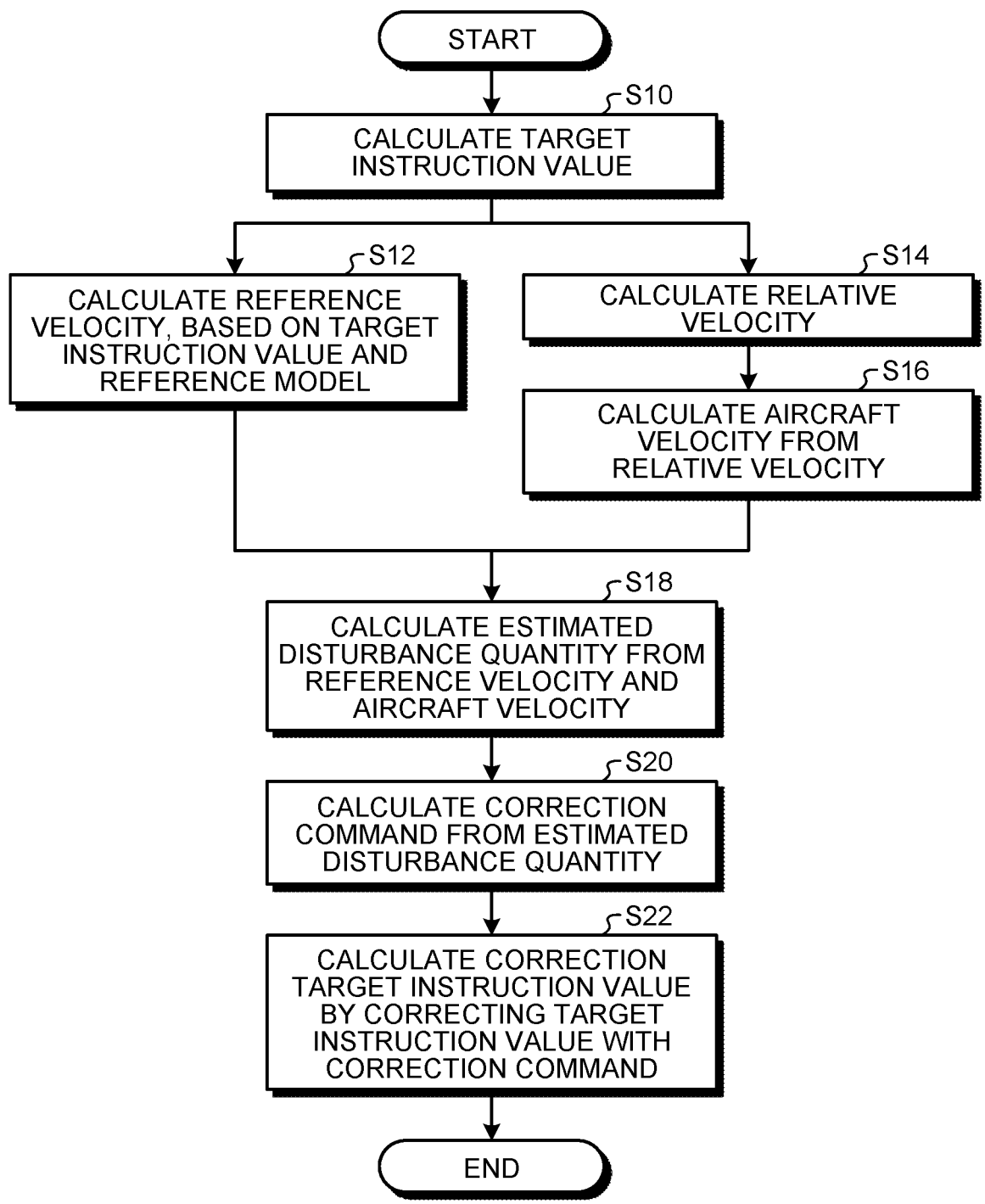
FIG. 10 is a flowchart for describing a procedure of calculating the correction target instruction value.

Next, a procedure of calculating the aforementioned correction target instruction value θ is described. FIG. 10 is a flowchart for describing the procedure of calculating the correction target instruction value. As illustrated in FIG. 10, the control system 100 calculates the target instruction value θ0 (step S10). The control system 100 then calculates the reference velocity $\Delta y_M(s)$ on the basis of the target instruction value θ0 and the reference model M (step S12). The control system 100 calculates the correction target instruction value θ from the target instruction value θ0 and the previously calculated correction command d'(s), and calculates the differential value θG between the correction target instruction value θ and the initial target instruction value θF0. The control system 100 inputs the differential value Δθ to the reference model M to calculate the reference velocity $\Delta y_M(s)$.

Meanwhile, the control system 100 calculates the relative velocity y0 of the aircraft 1 (step S14) and calculates the aircraft velocity Δy from the relative velocity y0 (step S16). The control system 100 calculates the differential value between the relative velocity y0 and the initial relative velocity yF0 as the aircraft velocity Δy.

The control system 100 then calculates the estimated disturbance quantity $\Delta y_N(s)$ from the reference velocity $\Delta y_M(s)$ and the aircraft velocity Δy(s) (step S18), and calculates the correction command d'(s) from the estimated disturbance quantity $\Delta y_N(s)$ (step S20). The control system 100 calculates the correction command d'(s) by converting the parameter of the estimated disturbance quantity $\Delta y_N(s)$ into the parameter of the target instruction value θ0. Then, the control system 100 next calculates the target instruction value θ0, and subsequently, corrects that target instruction value θ0 using the already calculated correction command d'(s) to calculate the correction target instruction value θ (step S22). The control system 100 controls the aircraft 1 using the correction target instruction value θ as the control quantity. The control system 100 stores the calculated correction command d'(s) therein, and after acquiring the target instruction value θ0 next, calculates the next correction command d'(s) using the already calculated correction command d'(s). In other words, the control system 100 continues to update and calculate the correction command d'(s).

Effects

As described above, the control system 100 for the aircraft 1 according to the present embodiment includes the target instruction value calculation unit 56, the reference velocity calculation unit 62, the relative velocity calculation unit 54, the estimated disturbance quantity calculation unit 64, and the correction target instruction value calculation unit 66. The target instruction value calculation unit 56 acquires the target instruction value θ0 to set the aircraft 1 in the target state. The reference velocity calculation unit 62 calculates the reference velocity $\Delta y_M(s)$ by inputting the value based on the target instruction value θ0 as the input value to the reference model M. The relative velocity calculation unit 54 calculates the relative velocity y0 of the aircraft 1 relative to the target position that is used to control the aircraft 1. The estimated disturbance quantity calculation unit 64 calculates the estimated disturbance quantity $\Delta y_N(s)$ acting on the aircraft 1 on the basis of the difference between the relative velocity y0 and the reference velocity $\Delta y_M(s)$. The correction target instruction value calculation unit 66 corrects the target instruction value θ0 on the basis of the estimated disturbance quantity $\Delta y_N(s)$ calculated at the previous timing.

Here, when the aircraft 1 flies, the disturbance such as a gust may occur and it may fail to control the aircraft properly. In contrast, the control system 100 according to present embodiment corrects the target instruction value θ0 with the estimated disturbance quantity $\Delta y_N(s)$ calculated using the reference model M, thereby removing the influence of the disturbance from the target instruction value θ0; thus, the aircraft 1 can be controlled as appropriate. In particular, by constructing the reference model M in advance, the influence of the disturbance can be removed quickly. In the reference model M, the parameter of the target instruction value θ0 is converted to the aircraft velocity to calculate the estimated disturbance quantity $\Delta y_N(s)$; thus, for example, by one integration, the calculation load can be reduced.

The relative velocity calculation unit 54 calculates the relative velocity y0 (relative velocity (ΔVx, ΔVy)) on the basis of the relative position (Xhg, Yhg) of the aircraft 1 relative to the target position. According to the control system 100, the relative velocity is calculated from the correction target instruction value θ corrected based on the estimated disturbance quantity $\Delta y_N(s)$, so that the aircraft 1 can be properly controlled by removing the influence of the disturbance.

The reference model M includes the element of the time delay in the change of the output value relative to the change of the input value. By including the element of the time delay in the reference model M, the control system 100 can calculate the estimated disturbance quantity $\Delta y_N(s)$ with high accuracy by getting closer to the actual behavior.

The estimated disturbance quantity calculation unit 64 converts the relative velocity y0 to the velocity of the aircraft 1 (aircraft velocity) and calculates the estimated disturbance quantity $\Delta y_N(s)$ on the basis of the difference between the converted aircraft velocity and the reference velocity. According to the control system 100, by converting the relative velocity y0 to the aircraft velocity, the parameter of the relative velocity y0 can be made in accordance with the reference velocity calculated by the reference model M, and the estimated disturbance quantity $\Delta y_N(s)$ can be calculated with high accuracy.

The control system 100 further includes the correction command calculation unit 65 that calculates the correction command d'(s) by converting the estimated disturbance quantity $\Delta y_N(s)$ into the same parameter as the target instruction value θ0. The correction target instruction value calculation unit 66 then corrects the target instruction value θ0 with this correction command d'(s). According to the control system 100, by converting the correction command d'(s) to the same parameter as the target instruction value θ0, the influence of the disturbance can be properly removed from the target instruction value θ0.

The target instruction value θ0 is the target value for the attitude of the aircraft 1. According to the control system 100, the influence of the disturbance can be properly removed from the target value for the attitude of the aircraft 1.

The reference model M includes the first reference model M1 that takes the value based on the target instruction value as the input value and in which the reference value of the attitude of the aircraft is set uniquely, and the second reference model M2 that takes the reference value of the attitude of the aircraft set in the first reference model M1 as the input value and in which the reference velocity of the aircraft is set uniquely. By setting the first reference model M1 and the second reference model M2 in this manner, the estimated disturbance quantity $\Delta y_N(s)$ can be calculated with high accuracy.

The aircraft 1 according to the present embodiment includes the control system 100. Therefore, the aircraft 1 can fly properly even when the disturbance occurs.

The control method for the aircraft 1 according to this embodiment includes a step of acquiring the target instruction value θ0 to set the aircraft in the target state, a step of inputting, to the reference model M in which the reference velocity corresponding to the reference value of the aircraft velocity is set uniquely as the output value in accordance with the input value, the value based on the target instruction value θ0 as the input value, thereby calculating the reference velocity, a step of calculating the relative velocity of the aircraft 1 to the target position, the relative velocity being used in control of the aircraft 1, a step of calculating the estimated disturbance quantity $\Delta y_N(s)$ acting on the aircraft 1, based on the difference between the relative velocity and the reference velocity, and a step of correcting the target instruction value θ0, based on the estimated disturbance quantity $\Delta y_N(s)$ calculated at the previous timing. According to this method, the aircraft 1 can be properly controlled by removing the influence of the disturbance from the target instruction value θ0.

A program according to this embodiment causes a computer to execute a step of acquiring the target instruction value θ0 to set the aircraft in the target state, a step of inputting, to the reference model M in which the reference velocity corresponding to the reference value of the aircraft velocity is set uniquely as the output value in accordance with the input value, the value based on the target instruction value θ0 as the input value, thereby calculating the reference velocity, a step of calculating the relative velocity of the aircraft 1 to the target position, the relative velocity being used in control of the aircraft 1, a step of calculating the estimated disturbance quantity $\Delta y_N(s)$ acting on the aircraft 1, based on the difference between the relative velocity and the reference velocity, and a step of correcting the target instruction value θ0, based on the estimated disturbance quantity $\Delta y_N(s)$ calculated at the previous timing. According to this program, the aircraft 1 can be properly controlled by removing the influence of the disturbance from the target instruction value θ0.

The embodiment of the present invention has been described above; however, the embodiment is not limited by the contents of this embodiment. The aforementioned components also include components that can be readily conceived by those skilled in the art, components that are substantially the same, and components that are in the so-called range of equivalence. Furthermore, the aforementioned components can be combined as appropriate. Furthermore, various omissions, substitutions, or modifications of the components can be made without departing from the range of the aforementioned embodiment.

REFERENCE SIGNS LIST

1 Aircraft
2 Target landing point
5 Vessel
30 Control unit
32 Image processing unit
34 Guidance calculation unit
36 Flight control unit
50 Target instruction value setting unit
52 Aircraft information acquisition unit
54 Relative velocity calculation unit
56 Target instruction value calculation unit
60 Correction target instruction value setting unit
62 Reference velocity calculation unit
64 Estimated disturbance quantity calculation unit
65 Correction command calculation unit
66 Correction target instruction value calculation unit

The invention claimed is:

1. An aircraft control system comprising:
   a target instruction value calculation unit configured to acquire a target instruction value to set an aircraft in a target state;
   a reference velocity calculation unit configured to input, to a reference model in which a reference velocity corresponding to a reference value of an aircraft velocity is set uniquely as an output value in accordance with an input value, a value based on the target instruction value as the input value, to calculate the reference velocity;
   a relative velocity calculation unit configured to calculate a relative velocity of the aircraft to a target position, the relative velocity being for control of the aircraft;
   an estimated disturbance quantity calculation unit configured to calculate an estimated disturbance quantity acting on the aircraft, based on a difference between the relative velocity and the reference velocity;
   a correction target instruction value calculation unit configured to correct the target instruction value based on the estimated disturbance quantity calculated at a previous time; and
   a flight control unit configured to perform flight control of the aircraft according to a correction target instruction value that is the corrected target instruction value.

2. The aircraft control system according to claim 1, wherein the relative velocity calculation unit is configured to calculate the relative velocity based on a relative position of the aircraft to the target position.

3. The aircraft control system according to claim 1, wherein the reference model includes an element of a time delay of a change of the output value relative to a change of the input value.

4. The aircraft control system according to claim 1, wherein the estimated disturbance quantity calculation unit is configured to convert the relative velocity into the aircraft velocity and calculate the estimated disturbance quantity based on a difference between the converted velocity and the reference velocity.

5. The aircraft control system according to claim 4, further comprising a correction command calculation unit configured to convert the estimated disturbance quantity into the same parameter as the target instruction value to calculate a correction command,
   wherein the correction target instruction value calculation unit is configured to correct the target instruction value with the correction command.

6. The aircraft control system according to claim 1, wherein the target instruction value is a target value for an attitude of the aircraft.

7. The aircraft control system according to claim 6, wherein the reference model includes: (i) a first reference model that takes the value based on the target instruction value as the input value and in which a reference value of the attitude of the aircraft is set uniquely; and (ii) a second reference model that takes the reference value of the attitude of the aircraft set in the first reference model as the input value and in which the reference velocity of the aircraft is set uniquely.

8. An aircraft comprising the aircraft control system according to claim 1.

9. An aircraft control method comprising:
   acquiring a target instruction value to set an aircraft in a target state;
   inputting, to a reference model in which a reference velocity corresponding to a reference value of an aircraft velocity is set uniquely as an output value in accordance with an input value, a value based on the target instruction value as the input value, to calculate the reference velocity;
   calculating a relative velocity of the aircraft to a target position, the relative velocity being used in control of the aircraft;

calculating an estimated disturbance quantity acting on the aircraft, based on a difference between the relative velocity and the reference velocity;

correcting the target instruction value, based on the estimated disturbance quantity calculated at a previous time; and performing flight control of the aircraft according to a correction target instruction value that is the corrected target instruction value.

10. A non-transitory computer-readable storage medium storing a program causing a computer to execute:

acquiring a target instruction value to set an aircraft in a target state;

inputting, to a reference model in which a reference velocity corresponding to a reference value of an aircraft velocity is set uniquely as an output value in accordance with an input value, a value based on the target instruction value as the input value, to calculate the reference velocity;

calculating a relative velocity of the aircraft to a target position, the relative velocity being used in control of the aircraft;

calculating an estimated disturbance quantity acting on the aircraft, based on a difference between the relative velocity and the reference velocity;

correcting the target instruction value, based on the estimated disturbance quantity calculated at a previous time; and performing flight control of the aircraft according to a correction target instruction value that is the corrected target instruction value.

* * * * *